Feb. 9, 1965 W. C. CONOVER 3,168,904
DUAL COMPARTMENT GAS TANK
Filed Feb. 23, 1962
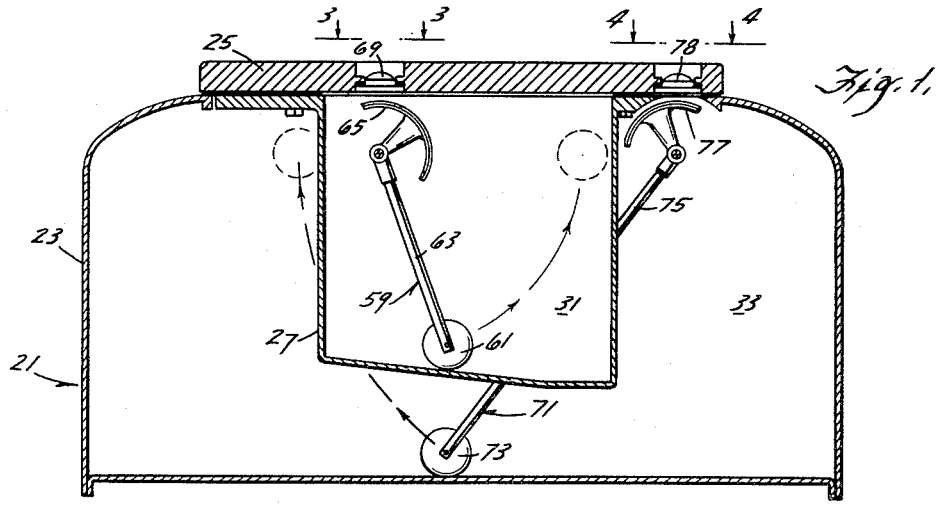
INVENTOR.
WARREN C. CONOVER
BY
Wheeler, Wheeler & Wheeler
ATTORNEYS.

3,168,904
DUAL COMPARTMENT GAS TANK
Warren C. Conover, Waukegan, Ill., assignor to Outboard Marine Corporation, Waukegan, Ill., a corporation of Delaware
Filed Feb. 23, 1962, Ser. No. 175,088
6 Claims. (Cl. 137—558)

The invention relates to, and has for its principal object, the provision of a fuel tank for storing a solution of fuel and lubricant (hereinafter referred to in the specification and the claims as fuel-oil mixture) for a two stroke, internal combustion engine or the like. The fuel tank is equipped with a gauge indicating the corresponding amounts of fuel and lubricant which may be added to the tank to fill the tank with a fuel-oil mixture having a predetermined ratio of fuel and lubricant. In addition, the gauge may also be calibrated to indicate the extent to which the tank is filled.

A further object of the invention is the provision of a unitary portable fuel tank incorporating a lubricant or oil storage chamber, a pump operable to deliver predetermined quantities of oil from the oil chamber to the fuel-oil mixture chamber, and a gauge as described above, which gauge is calibrated, with respect to the proportionate amount of lubricant, in terms of the number of predetermined lubricant quantities or pump operations.

A further feature of the invention is a closure which is adapted for assembly with an open top fuel tank and which unitarily carries an oil receptacle, a pump connected to deliver oil from the receptacle into the tank, a filler cap, and the aforesaid gauge. A carrying handle for the tank assembly is also preferably included as part of the closure unit.

A general object of the invention is to provide an improved fuel tank. Other objects of the invention will become apparent by reference to the following description and the accompanying drawings of one embodiment of the invention.

In the drawings:
FIGURE 1 is a sectional view of a fuel tank embodying various of the features of the invention;
FIGURE 2 is a further sectional view of the fuel tank shown in FIGURE 1, which further view is taken parallel to and is transversely displaced from the view shown in FIGURE 1;
FIGURE 3 is an enlarged fragmentary view taken generally along line 3—3 of FIGURE 1; and
FIGURE 4 is an enlarged fragmentary view taken generally along line 4—4 of FIGURE 1.

The fuel tank 21 shown in FIGURES 1 and 2 is a unitary, portable tank of metal or other sufficiently sturdy non-flammable material, which tank includes a lower portion or main body 23 having a substantially large open mouth at the top thereof, and a cover or upper part 25 which is suitably secured, in fluid-tight engagement, by means not shown, to the main body 23 of the tank 21. Attached in fluid-tight engagement to the cover 25 is a receptacle or container 27 which has associated therewith pump means 29. The receptacle and pump means are proportioned to pass through the open mouth of the main tank body so that there is provided a first chamber 31 defined by the receptacle 27 and the cover 25 for the storage of oil, and a second chamber 33 defined by the volume in the main body 23 less the volume of the receptacle and associated pump means 29. The second chamber 33 is intended for storage of the fuel-oil mixture. The pump means is operable to deliver predetermined quantities of oil from the oil storage chamber 31 to adjacent the bottom of the fuel-oil mixture storage chamber 33.

The cover 25 also includes supply ports 35 and 37 communicating respectively with the oil chamber 31 and the fuel-oil mixture chamber 33. Suitable closures 39 and 41 are respectively associated with the supply ports 35 and 37. Also secured to the cover 25 is a pivotally mounted handle 43 which facilitates carrying of the fuel tank 21.

The specific constructional details of the fuel tank 21 are not a part of the disclosed invention so long as there is provided an oil storage chamber, a fuel-oil mixture storage chamber, a pump for delivering predetermined oil quantities from the oil chamber to the fuel-oil mixture chamber, and closure means facilitating independent filling of each of the chambers.

Various forms of pumps can be used. In the disclosed construction a manually operable pump having a plunger 45 including a piston 47 movable in a pumping chamber 49 is used. The pumping chamber is connected to the bottom of the oil storage chamber 31 through an intake port 51 having associated therewith a disk valve 53 which is closed in response to creation of a positive pressure in the pumping chamber. Oil is discharged from the pumping chamber 49 through discharge port means 55 positioned adjacent the bottom of the chamber 49.

Associated with the discharge port means 55 is a flapper valve member 57 of flexible material, which valve member is closed on the suction or intake stroke of the piston 47 and is opened by the creation of a positive pressure condition in the pumping chamber 49. The plunger 45 is biased by means (not shown) to locate the piston 47 at the top of the pump chamber 49 to obtain complete filling of the pumping chamber with oil so long as there is oil in the chamber 31, whereby a predetermined quantity of oil is transferred from the oil chamber to the bottom of the fuel-oil mixture chamber, each time the plunger 45 is depressed. The location of the discharge port means 55 at the bottom of the chamber facilitates more rapid intermixture of the oil with the relatively heavier gasoline.

The oil storage chamber 31 includes gauge means 59 which is calibrated to indicate the quantity of oil in the chamber 31. In the disclosed construction, the gauge means 59 includes a float element 61 connected to one end of a pivotally mounted rod 63, and an arcuate member 65 which is connected to the other end of the rod 63 and moves relative to an adjacent standard or fixed marker 67 so as to provide a reading which is readily viewable through a transparent eye-piece 69 in the cover 25. The member 65 is graduated, as shown in FIGURE 3, to reflect the number of predetermined oil quantities in the chamber. If desired, the member 65 can be additionally calibrated to show the empty volume in the chamber 31 so that anyone using the fuel tank can readily determine how much oil can be added to the chamber without overflowing.

Associated with the fuel-oil mixture chamber 33 is another gauge means 71 which is calibrated to facilitate filling of the chamber 33 with a fuel-oil mixture having a predetermined ratio of fuel to lubricant. In the disclosed construction, the gauge means includes a float 73 supported at the lower end of a pivotally mounted bar 75, and an arcuate member 77 at the other end of the bar, which member is viewable through a transparent eye-piece 78 and moves relative to an adjacent standard or fixed marker 79 incident to a change in the level of the fuel-oil mixture in the chamber 33.

The member 77 is calibrated so as to indicate the number of said predetermined oil quantities and the corresponding quantities of fuel which can be added when the fuel-oil mixture is at any level in the chamber 33 so as to obtain a full tank having a fuel-oil mixture with said predetermined ratio. In the specifically disclosed construction, as shown in FIGURE 4, parallel marking rows 81 and 83 are provided on the member 77. The row 81 is calibrated in fractional gallons of gasoline while the other row 83 is calibrated to indicate the corresponding number of predetermined oil quantities which, together with the appropriate quantity of fuel, will provide said predetermined fuel to oil ratio. If desired, the member 77 can also be calibrated to reflect the overall quantity of fuel-oil mixture in the chamber 31, thereby enabling the user to determine how much mixture is in the tank at any time. If a fuel-oil mixture with other than the predetermined ratio hereinbefore referred to is desired, another arcuate member calibrated for the particular ratio desired must be substituted for the member.

With the above arrangement, the user of the tank can readily determine how much fuel-oil mixture is in the chamber 33, how many gallons of fuel, together with the corresponding number of predetermined oil quantities can be discharged into the chamber 31 to fill it, and the number of said predetermined oil quantities which are available in the chamber 31 for transfer to the fuel-oil mixture chamber 33. In filling the chamber 33, the user notes the quantity of fuel and oil to be added, depresses the plunger the desired number of times, and adds the specified quantity of fuel. As a result, the user obtains a filled fuel-oil mixture chamber having the proper fuel to oil ratio.

Various of the features of the invention are set forth in the following claims.

What is claimed is:

1. A fuel tank comprising a chamber for storing a fuel-oil mixture and gauge means associated with said chamber for facilitating filling of said chamber with a fuel-oil mixture having a predetermined ratio of fuel and oil, said gauge means including marking means for indicating the quantity of fuel and the quantity of oil which will fill the available volume in said chamber with a fuel-oil mixture having said predetermined ratio of fuel and oil.

2. The combination of a first chamber for storing lubricant, a second chamber for storing a fuel-oil mixture, pump means for transferring a predetermined quantity of oil from said first chamber to said second chamber in response to each complete actuation thereof, first gauge means having marking means for indicating the number of said predetermined quantities of oil in said first chamber, and second gauge means for facilitating filling of said second chamber with a fuel-oil mixture having a predetermined ratio of fuel and oil, said second gauge means being calibrated with marking means for reflecting the available volume in said second chamber and for indicating the quantity of fuel and the number of said predetermined oil quantities which will fill the available volume in said second chamber with a fuel-oil mixture having said predetermined ratio of fuel and oil.

3. A combination in accordance with claim 2 wherein each of said first and second chambers has associated therewith separate closure means permitting said chambers to be filled respectively with oil and fuel, and said pump means is manually operable and includes a plunger extending exteriorly of said tank.

4. A unit for assembly with a fuel tank having a large top opening so as to close said opening, said unit comprising a cover adapted for closing of said opening, a storage chamber for oil mounted on said cover, pump means mounted on said cover in communication with said storage chamber for discharge of oil into the fuel tank, a first supply port in said cover communicating with said storage chamber, and first gauge means mounted on said cover and calibrated with marking means for indicating the quantities of fuel and oil which will fill the available volume in the fuel tank with a fuel-oil mixture having a predetermined ratio of fuel and oil.

5. A unit in accordance with claim 4 including additional gauge means carried on said cover and calibrated for indicating the quantity of oil in said storage chamber.

6. A unit in accordance with claim 5 including handle means mounted on said cover, a second supply port in said cover free of connection with said storage chamber, whereby fuel can be added directly to the fuel tank when said cover and said fuel tank are assembled, and wherein said pump means is operable to deliver a predetermined quantity of oil for each actuation thereof, said first gauge means indicates the quantity of oil in terms of the number of actuations of said pump means, and said additional gauge means indicates the quantity of oil in said storage chamber in terms of the number of actuations of said pump means.

References Cited in the file of this patent

UNITED STATES PATENTS

| | | |
|---|---|---|
| 943,868 | Garlick | Dec. 21, 1909 |
| 1,298,606 | Webster | Mar. 25, 1919 |
| 1,696,347 | Ford | Dec. 25, 1928 |
| 1,790,968 | Baulino | Feb. 3, 1931 |
| 1,997,002 | Ledoux | Apr. 9, 1935 |
| 2,405,442 | Mayo | Aug. 6, 1946 |
| 2,550,157 | Mazza | Apr. 24, 1951 |
| 2,814,308 | Mowat | Nov. 26, 1957 |
| 2,908,289 | Everett | Oct. 13, 1959 |
| 2,986,162 | Spexarth | May 30, 1961 |